(No Model.)
L. B. LANCASTER.
PLANTER.
No. 518,671. Patented Apr. 24, 1894.
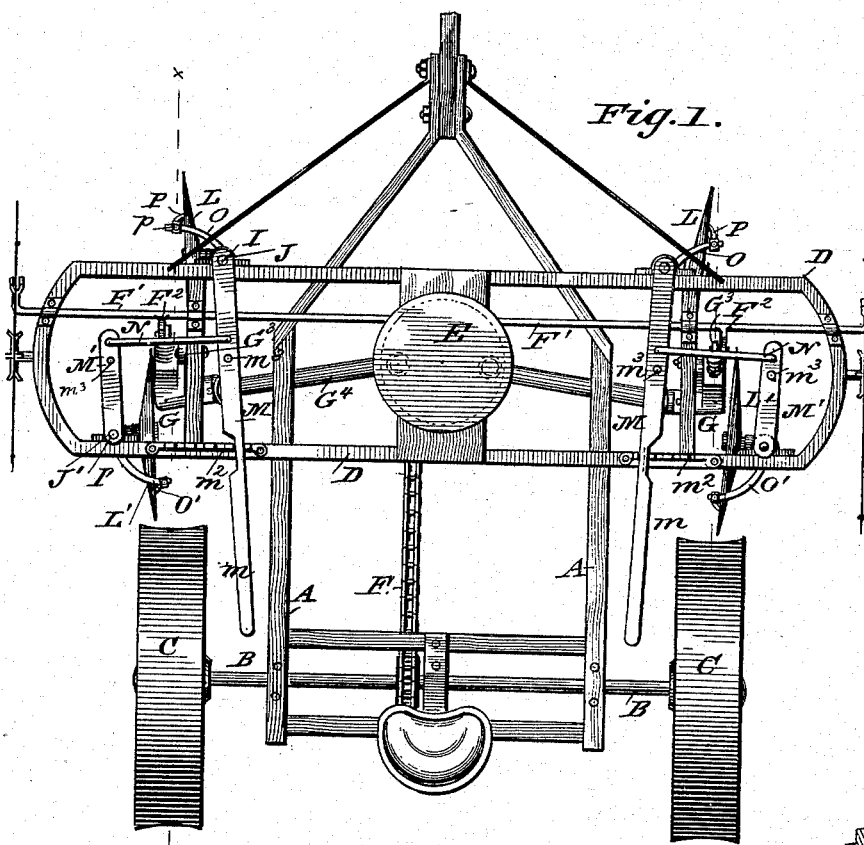
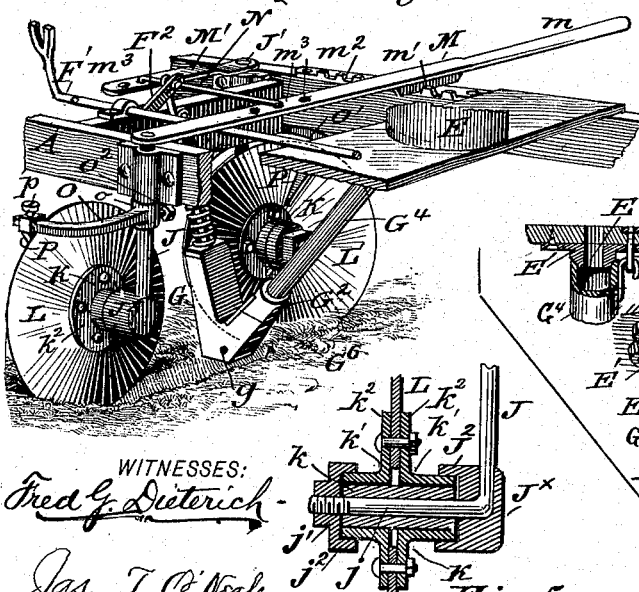
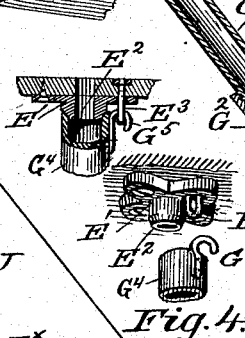
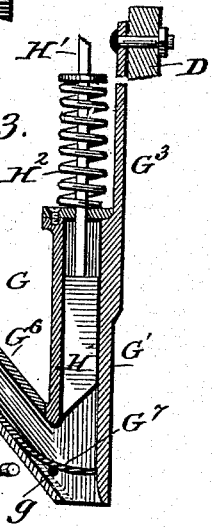
WITNESSES:
Fred G. Dieterich
Jas. T. O'Neale
INVENTOR
Levi B. Lancaster
BY A. W. Evans & Co.
ATTORNEYS

UNITED STATES PATENT OFFICE.

LEVI B. LANCASTER, OF MASSILLON, IOWA.

PLANTER.

SPECIFICATION forming part of Letters Patent No. 518,671, dated April 24, 1894.

Application filed September 5, 1893. Serial No. 484,857. (No model.)

*To all whom it may concern:*

Be it known that I, LEVI B. LANCASTER, a citizen of the United States, residing at Massillon, in the county of Cedar and State of Iowa, have invented certain new and useful Improvements in Planters, of which the following is a full, clear, and exact description, reference being had to the accompanying drawings, and to letters of reference marked thereon, forming a part of this specification, in which—

Figure 1, is a plan view of a corn planter with my improvements applied. Fig. 2, is a perspective view of one set of the furrow opener and furrow closing disks. Fig. 3, is a vertical section of the seed dropping mechanism. Fig. 4, is a detail view illustrating the manner of connecting the seed tube to the seed box. Fig. 5, is a sectional view of one of the disk bearings or supports, hereinafter referred to.

The invention relates to planters and the object is to provide a machine which may be used to drop or drill the seed and open and close the furrows therefor in a very advantageous manner.

The invention consists in the construction hereinafter described and claimed.

A, represents the main frame, B the axle, C the bearing wheels, D the transverse frame, E the seed hopper and F the chain for operating the seed plate or slide (not shown) from the axle. F' is the armed rock-shaft operated by the knotted wire. These parts are all constructed in the usual well known manner and need no further description.

Two sets of furrow opening and closing mechanisms and two seed delivery tubes are shown and as they are exactly alike I will describe but one set.

G, is the seed delivery spout comprising a vertical member G' and an inclined member $G^2$ the former having a suspension arm $G^3$ pivotally connected with the cross bar of the frame D and the member $G^2$ being provided with a tube $G^4$ extending up to the outlet of the seed hopper E. The outlet of the seed hopper is received in a plate E' having a nipple-like extension $E^2$ on its lower side registering with the upper end of the tube $G^4$ and this plate E' is also provided with an eye $E^3$ into which extends a hook $G^5$ on the upper end of the tube $G^4$. Thus the seed delivery spout G and its attached parts may swing rearwardly in case the lower end of the box should strike a rock, root or other obstruction and the spout or box will return by gravity to its normal position.

$G^7$ is a spring tongue or valve secured to the bottom wall of the member $G^2$ and extends thence across the interior of the spout or box to close the same and prevent the exit of the seed which is delivered in charges from the seed hopper.

H, is a reciprocating plunger working in the vertical member of the spout or box and normally held therein above the lower end of the branch member $G^2$ by means of the spring $H^2$ upon its rod H'. The rods H' are connected with crank arms $F^2$ on the rock-shaft F' so that the plungers will be operated thereby.

The seed delivery spout G is provided with apertures $g$ just below its branch $G^2$ through which a pin $g'$ is adapted to be passed for a purpose to be hereinafter described.

I I' are bearings mounted on the frame D in front and rear of the seed delivery spout: the bearing I being to the inside, and the bearing I' to the outside of a longitudinal line $x$—$x$ drawn through the frame and spout or box.

J, is a vertical shaft journaled in the box I and bent outwardly at its lower end and J', is a similar shaft journaled in the box I' and bent inwardly at its lower end. The angles of these two shafts are strengthened by filling pieces $J^x$ whose outer faces form flat bearing surfaces. Sand collars or flanges $J^2$ project from these filling or shoulder pieces and receive the inner ends of the hubs K of the concave disks L L'. Upon the horizontal members $j$ of the shafts J J' are placed thimbles $k$ which fit the bores of the hubs and take the wear thereof. The hubs K of the concave disks L L' are each formed in two sections $k'$ $k'$ having flanges $k^2$ $k^2$ at their inner ends bolted or riveted to the disks at opposite sides thereof to impart firmness or stiffness thereto. The disks are held on the parts $j$ by means of nuts $j'$ which are formed on their inner sides with flanges or sand bands $j^2$ extending over the outer ends of the hubs.

M, is a lever extending rearwardly from the shaft J and provided at its rear end with a handle $m$ which extends along side of the driver's seat and on the under side of the lever is a tooth $m'$ which engages a transverse rack $m^2$ on the frame D whereby the lever may be locked in any desired position.

M' is a lever extending forwardly from the shaft J' and is provided with a longitudinal series of apertures $m^3$; the lever M also having such a series of apertures $m^3$ between its ends.

N, is a link having its ends bent to enter the apertures $m^3$ and thus connect the levers for simultaneous movement. The concave side of the disk L faces outward while the concave side of the disk L' faces inward.

O O' are collared arms secured to the shafts J J' just below their boxes I I' by means of set screws $O^2$ and said arms project in opposite directions across the upper edges of the disks and are there provided with depending scraper blades P adjusted toward or from the concave side of the disks by means of their set screws $p$. The collars $o$ $o$ of the arms O O' limit the upward movement of the shafts J J' in their bearings and thus the said arms serve a a two-fold purpose. When the teeth on levers M are in engagement with the innermost teeth of the racks $m^2$ the disks will be held in parallel longitudinal planes but as the levers are moved outwardly the disks will be given oblique positions; the disk L being inclined inwardly at its forward portion and the disk L' inclined outwardly at its forward portion. It is manifest that the size of the furrow opened will increase or decrease according to the position of the forward disk L and at the same time the rear disk L' will be simultaneously adjusted to cover a furrow of whatever size made by the front disk. In other words whatever sized furrow has been opened by the front disk a sufficient amount of earth will be scraped up by the rear disk to cover the same and the seed being delivered between the two disks will always be properly planted. Moreover the two disks will thoroughly loosen and pulverize the earth in which the seed has been dropped. As the machine travels forwardly the seed will be delivered in regular charges to the seed delivery spouts and will be forced therefrom by the downward strokes of the plungers; the plungers then closing the branches or inclined members to prevent further dropping of the seed into the vertical member. When the plungers are raised the spring tongues or valves $G^7$ will follow them and again close the lower end of the vertical member.

If the machine is to be used as a drill the spring $G^7$ is depressed and the pin $g'$ inserted in hole $g$ so as to hold the spring tongue or valve depressed or retracted and thereby leave the outlet end of the seed delivery spout open. The check wire will not be employed of course when the machine is used as a drill and the plungers H will be held elevated by their springs $H^2$ so that the seed will have an unobstructed passage through the seed delivery spout.

Having thus described my invention, what I claim, and desire to secure by Letters Patent of the United States, is—

1. The combination with the front and rear disks in different longitudinal planes for opening and closing the furrow, respectively, of a seed delivering box or spout discharging in the longitudinal plane between said disks and at a point intermediate of their axes; whereby the seed will be deposited in the furrow formed by the front disk and be covered by the soil thrown into the furrow by the rear disk, substantially as herein described.

2. The combination with the front and rear disks connected for simultaneous oblique adjustment and adapted to respectively open and close the furrow, of a seed delivery mechanism discharging in the longitudinal plane between said disks and at a point intermediate of their axes; whereby the seed will be deposited in the furrow formed by the front disk, and be covered by the soil thrown into the furrow by the rear disk, substantially as herein described.

3. The combination with the vertical horizontally turning shafts having transversely extending lower ends; said shafts being at opposite sides of a line extending longitudinally through the machine, disks journaled on the said lower ends and a lever mechanism connecting the said shafts for simultaneous adjustment, of a seed delivery spout or box discharging between the front and rear disks, substantially as herein described.

4. The combination with the vertical horizontally turning shaft having a transversely bent lower end, an integral filling piece or block in the angle formed thereby, and provided with a flat outer face and a sand band, and a loose thimble on the said lower end, of the disk provided with opposite, flanged hub-sections receiving said thimble and a nut provided with a sand band, substantially as herein described.

5. The combination with the vertical horizontally turning disk-carrying shaft, of a laterally projecting arm secured to said shafts extending across the disk and provided at its outer end with an adjustable scraper blade engaging the concave face of the disk, substantially as herein described.

6. The combination with the vertical front and rear bearings at opposite sides of a longitudinal line through the machine, and the vertical shafts turning in said bearings and carrying the furrow-opening and closing disks respectively on their lower ends, and the seed delivery mechanism discharging in the plane between said disks and at a point intermediate of their axes of the adjustable collared arms on the said shafts adjacent to the lower ends of the bearings, set screws extending through said collars into engagement with the shafts, and the adjustable scraper blades on the outer ends of said arms and engaging the concave disk faces, substantially as herein described.

7. The combination with the front and rear vertical horizontally turning shafts in different planes, and provided with transverse lower members, and the furrow-opening and closing disks thereon, of the rearwardly extending apertured lever connected with the forward shaft, the oppositely projecting lever on the rear shaft, an adjustable link connecting said two levers, and a seed delivery mechanism delivering between the said two disks, substantially as herein described.

8. The combination with the seed hopper, of the seed delivery spout suspended by an arm from the frame to yield rearwardly, and provided with a seed supply pipe pivoted at its upper end in register with the outlet from the seed box, substantially as herein described.

9. The combination with the seed delivery spout having a lateral seed-inlet member between its ends and a plunger working past said inlet, of a spring tongue crossing the outlet end of the spout in the path of the plunger and a locking device to hold the spring tongue or valve retracted and permit a continuous flow of seed through the spout, substantially as herein described.

10. The combination with the seed delivery spout having a lateral inlet or branch section, a spring tongue secured in the bottom of said section and projecting across the spout outlet, apertures in the spout below said branch section and a pin for locking said spring retracted, of the spring-retracted plunger normally lying in the upper portion of the spout above the branch section, substantially as herein described.

11. The combination with the seed hopper having a plate at its outlet and provided with a nipple and an eye, of the seed delivery spout having a branch seed supply pipe provided at its upper end with a hook engaging said eye and holding the pipe or tube in register with said nipple, an arm extending upwardly from the seed delivery spout and pivoted to the frame, whereby the seed delivery spout may yield rearwardly, the spring tongue in the lower part of the seed delivery spout, the vertically reciprocating plunger, and its operating mechanism and the furrow opening and closing disks in front and rear and at opposite sides of the seed delivery spout, substantially as herein described.

12. The combination with a furrow opener, and a seed tube or spout in rear of the said opener to discharge the seed into the furrow formed thereby, of a furrow closer in rear of the seed tube or spout and in a different longitudinal plane from said furrow opener to cover the seed in the furrow and operative connections between the said furrow opener and closer for relatively and simultaneously adjusting them, substantially as herein described.

LEVI B. LANCASTER.

Witnesses:
C. L. KEITH,
JOSEPH MILVER.